(No Model.)
O. B. & J. M. STILLMAN.
METHOD OF AND APPARATUS FOR BLEACHING SUGAR.
No. 297,029. Patented Apr. 15, 1884.
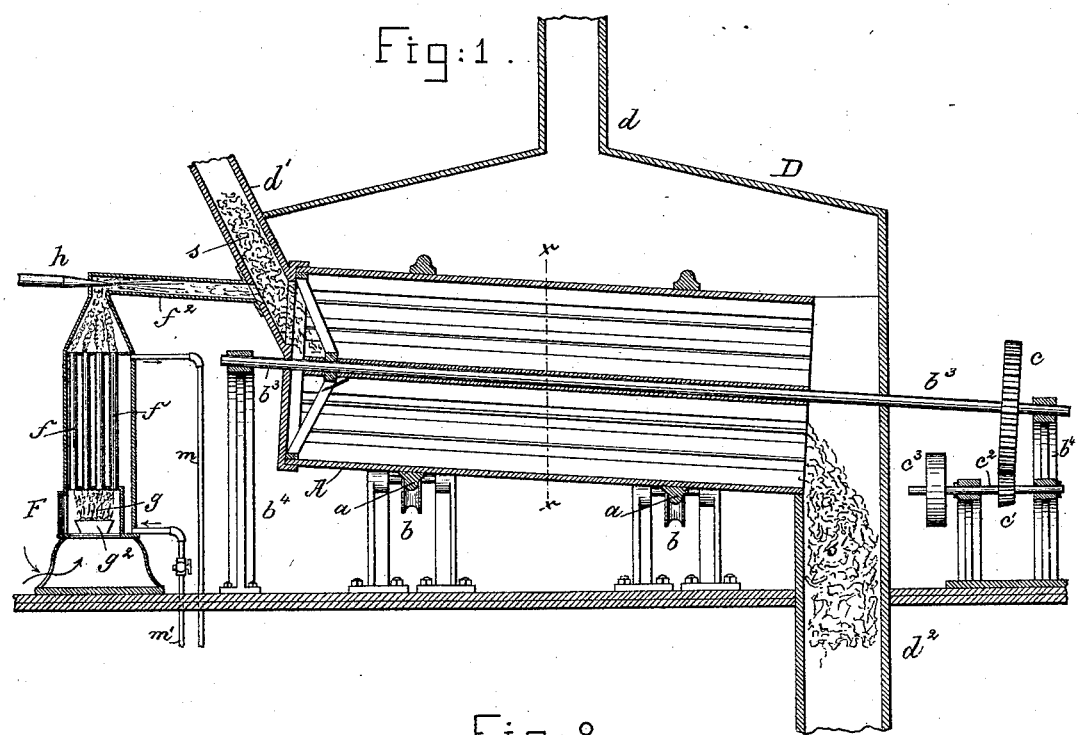
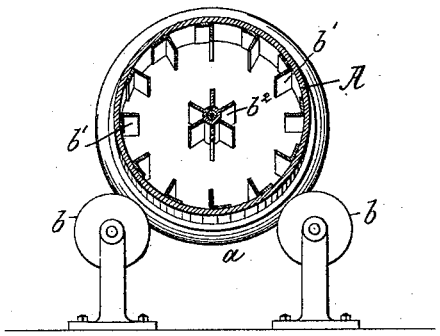
Witnesses.
Arthur Zipperlen.
Henry March.
Inventors
Oscar B Stillman
John M. Stillman
by Crosby Gregory Attys

UNITED STATES PATENT OFFICE.

OSCAR B. STILLMAN, OF NATICK, AND JOHN M. STILLMAN, OF WATERTOWN, MASSACHUSETTS.

METHOD OF AND APPARATUS FOR BLEACHING SUGAR.

SPECIFICATION forming part of Letters Patent No. 297,029, dated April 15, 1884.

Application filed December 26, 1883. (No model.)

*To all whom it may concern:*

Be it known that we, OSCAR B. STILLMAN, of Natick, county of Middlesex, State of Massachusetts, and JOHN M. STILLMAN, of Watertown, county of Middlesex, State of Massachusetts, have invented an Improvement in Methods of and Apparatus for Bleaching Sugar, of which the following description, in connection with the accompanying drawings, is a specification, like letters on the drawings representing like parts.

This invention has for its object to cheaply bleach or remove more or less of the color from sugar while in its crystalline or granular condition, to thus improve its appearance and market value.

In accordance with our invention the sugar in crystalline or granular state and in motion is subjected to the action of sulphurous-acid gas for a very brief period of time, as will be hereinafter described, the said gas being preferably produced from sulphur or its compounds by burning or otherwise, the gas being passed into the sugar while the latter is in motion.

Figure 1 in section represents an apparatus for partially bleaching or decolorizing sugar in accordance with our invention, and Fig. 2 a partial section thereof on the dotted line $x\ x$.

The rotating drum A, its attached rings $a$, to run on rollers $b$, and its shelves $b'\ b^2$, and having its axle or carrying shaft $b^3$ supported in bearings $b^4$, are as usual in granulating and drying machines for sugar, and the said drum is rotated by gears $c\ c'$, shaft $c^2$, and pulley $c^3$, the latter being driven by a belt in any usual manner.

The drum A, preferably built into a case, D, having a flue, $d$, leading to a suitable chimney, has a feeding-chute or conductor, $d'$, down which and into the drum the crystalline or granular sugar $s$, more or less comminuted, travels, its speed of movement being regulated as may be desired, and during the rotation of the drum the sugar is delivered therefrom, as at $s'$, into the discharge-pipe $d^2$ or other suitable receptacle.

As herein shown, the sulphurous-acid gas is produced by burning sulphur in a furnace, F, composed of a metal boiler-like shell containing water, and having tubes $f$, and a combustion-chamber, $g$, the said boiler $k$ having a pipe, $f^2$, connected with it, which leads the sulphurous-acid gas into the moving mass of crystallized or granular sugar $s$.

The fumes and gases rising from the sulphur burned in the pan $g^2$ are cooled by the water surrounding the pipes $f$, and before being discharged into the sugar receive, preferably, a jet of steam, or it may be moistened or dry air, which is passed into the pipe $f^2$ through the nozzle or pipe $h$, connected, preferably, with a boiler for the production of steam, so that live steam may pass into the pipe $f^2$.

The pipes $h$ and $f^2$ and flue $d$ will be provided with suitable valves to control the passage of material through them.

The pipes $m\ m'$ are to provide the boiler with water.

We are aware that different substances in mass have been subjected to the action of sulphurous-acid gas under pressure in a closed chamber, as in United States Patent No. 254,471.

We claim—

1. In an apparatus for bleaching or decolorizing sugar, a chute or passage for the sugar, combined with an apparatus for the production of sulphurous-acid gas, and with a pipe to discharge the said gas into the sugar, substantially as described, to operate as and for the purposes set forth.

2. The chute $d$, for the passage of the crystallized or granular sugar, combined with the pipe $f^2$, to conduct sulphurous-acid gas into the said sugar, and with a pipe, $h$, to deliver steam into the pipe $f^2$, substantially as described.

3. A chute or conductor for the sugar, and rotary cylinder to receive the sugar from the said chute or conductor, combined with a pipe to conduct sulphurous-acid gas into the said sugar, and with an apparatus for the production of the said gas, as and for the purposes set forth.

4. In the art of manufacturing sugar, subjecting the crystallized or granular sugar, while in motion, to the action of sulphurous-acid gas, as and for the purpose described.

In testimony whereof we have signed our names to this specification in the presence of two subscribing witnesses.

OSCAR B. STILLMAN.
JOHN M. STILLMAN.

Witnesses:
GEO. W. GREGORY,
W. H. SIGSTON.